(12) United States Patent
Klinger

(10) Patent No.: US 9,015,608 B2
(45) Date of Patent: *Apr. 21, 2015

(54) REGENERATING A USER INTERFACE AREA

(75) Inventor: Uwe Klinger, Bad Schoenborn (DE)

(73) Assignee: SAP SE, Walldorf (DE)

( * ) Notice: Subject to any disclaimer, the term of this patent is extended or adjusted under 35 U.S.C. 154(b) by 287 days.

This patent is subject to a terminal disclaimer.

(21) Appl. No.: 13/549,547

(22) Filed: Jul. 16, 2012

(65) Prior Publication Data

US 2014/0019889 A1  Jan. 16, 2014

(51) Int. Cl.
G06F 17/20 (2006.01)
G06F 17/30 (2006.01)
G06F 9/44 (2006.01)

(52) U.S. Cl.
CPC ............ *G06F 17/30569* (2013.01); *G06F 8/38* (2013.01)

(58) Field of Classification Search
CPC .................................................. G06F 17/30569
See application file for complete search history.

(56) References Cited

U.S. PATENT DOCUMENTS

| | | | | |
|---|---|---|---|---|
| 7,366,723 | B2 * | 4/2008 | Shaburov ............................... | 1/1 |
| 2003/0035003 | A1 * | 2/2003 | Marcos et al. ................. | 345/760 |
| 2003/0046286 | A1 * | 3/2003 | Jacobs et al. ....................... | 707/8 |
| 2003/0046401 | A1 * | 3/2003 | Abbott et al. ................... | 709/228 |
| 2003/0217331 | A1 * | 11/2003 | McKellar et al. .............. | 715/511 |
| 2003/0225826 | A1 * | 12/2003 | McKellar et al. .............. | 709/203 |
| 2003/0226106 | A1 * | 12/2003 | McKellar et al. .............. | 715/513 |
| 2004/0143606 | A1 * | 7/2004 | Pauly et al. .................... | 707/200 |
| 2004/0172598 | A1 * | 9/2004 | Hammerich et al. .......... | 715/513 |
| 2005/0038791 | A1 * | 2/2005 | Ven ................................ | 707/100 |
| 2005/0204047 | A1 * | 9/2005 | Mitchell et al. ................ | 709/228 |
| 2005/0229190 | A1 * | 10/2005 | Peters et al. ................... | 719/331 |
| 2006/0041623 | A1 * | 2/2006 | Danninger ..................... | 709/206 |
| 2006/0075382 | A1 * | 4/2006 | Shaburov ....................... | 717/106 |
| 2007/0143301 | A1 * | 6/2007 | Tran ................................ | 707/10 |
| 2008/0104025 | A1 * | 5/2008 | Dharamshi et al. ............... | 707/3 |
| 2008/0162095 | A1 * | 7/2008 | Brunswig et al. .................. | 703/6 |
| 2008/0195933 | A1 * | 8/2008 | McKellar et al. .............. | 715/234 |
| 2009/0248730 | A1 * | 10/2009 | Burns ............................ | 707/102 |
| 2010/0050152 | A1 * | 2/2010 | Gilboa ........................... | 717/106 |
| 2011/0013558 | A1 * | 1/2011 | Chang ........................... | 370/328 |
| 2011/0265020 | A1 * | 10/2011 | Fields et al. ................... | 715/760 |
| 2012/0054659 | A1 * | 3/2012 | Demant et al. ................ | 715/771 |
| 2012/0150792 | A1 * | 6/2012 | Yassin et al. .................. | 707/602 |
| 2012/0173248 | A1 * | 7/2012 | Smith ............................ | 705/1.1 |
| 2012/0254201 | A1 * | 10/2012 | Cochrane et al. ............. | 707/754 |

OTHER PUBLICATIONS

SAP Test Acceleration and Optimization 2.0 (program verified available as of Dec. 2010).*

* cited by examiner

*Primary Examiner* — William Bashore
*Assistant Examiner* — Nathan Shrewsbury

(57) ABSTRACT

A user interface (UI) area having multiple data sources is regenerated based upon changes made to UI elements associated with the UI area. To efficiently regenerate the changed UI elements, a processor of the computer determines UI controls and data objects associated with the UI area to generate a conditional list. The conditional list includes corresponding events representing an association of the UI controls and the data objects. Based upon a modification to a data object, an optimized data binding structure is generated to determine a corresponding UI control that is affected by the modification. An updated UI controls list is computed to include the affected one or more UI controls based upon the optimized data binding structure. Based upon a trigger to render the UI area, the affected UIs are regenerated on the UI area by updating the affected UI controls based upon the modification.

16 Claims, 4 Drawing Sheets

REGENERATING A USER INTERFACE AREA

TECHNICAL FIELD

The field generally relates to computer systems and software, and more particularly to software methods and systems to regenerate user interface areas.

BACKGROUND

User interface (UI) technologies focus on interface technologies that support human-computer interaction. UI technology research focuses on the enabling technologies that help computers hear, see, speak and to understand, and combine these in multimodal ways. Rendering an entity on a UI includes generating a visual representation from a model by using computer programs. Updating the UI indicates that an already displayed visual representation is partially or completely refreshed.

Since the model associated with the UI includes enormous amount of information, updating the UI partially or completely causes significant information exchange between a server hosting the model and the processor processing the update. Due to the amount of information exchange, there may be an overhead caused on the processor including excessive or indirect computing time, memory, bandwidth and the like. Hence, reducing the amount of data transfer and the overhead while maintaining accuracy in updating the UI is useful.

SUMMARY

Various embodiments of systems and methods to regenerate a computer generated user interface (UI) area are disclosed. The UI area having multiple data sources is regenerated based upon changes made to UI elements associated with the UI area. UI elements associated with the UI area include UI controls and data objects. To efficiently regenerate the changed UI elements, a processor of the computer determines UI controls and data objects associated with the UI area to generate a conditional list. Generating the conditional list includes determining events based upon a correlation between the data objects, the UI controls and the UI area. The conditional list represents an association of the UI controls and the data objects by verifying whether the UI controls and the data objects reflect any modification performed on the data objects.

Based upon a modification to a data object, an optimized data binding structure is generated to determine a corresponding UI control that is affected by the modification. The optimized data binding structure is generated by distinguishing between data bindings associated with data instances and data bindings associated with iterative data objects. An updated UI controls list is computed to include the affected one or more UI controls based upon the optimized data binding structure. If the modification is performed on a UI control, the UI control is directly added to the UI controls list. Based upon a trigger to render the UI area, the affected UIs are regenerated on the UI area by updating the affected UI controls based upon the modification.

These and other benefits and features of embodiments will be apparent upon consideration of the following detailed description of the embodiments thereof, presented in connection with the following drawings.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for systems and methods to regenerate a user interface area are disclosed herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
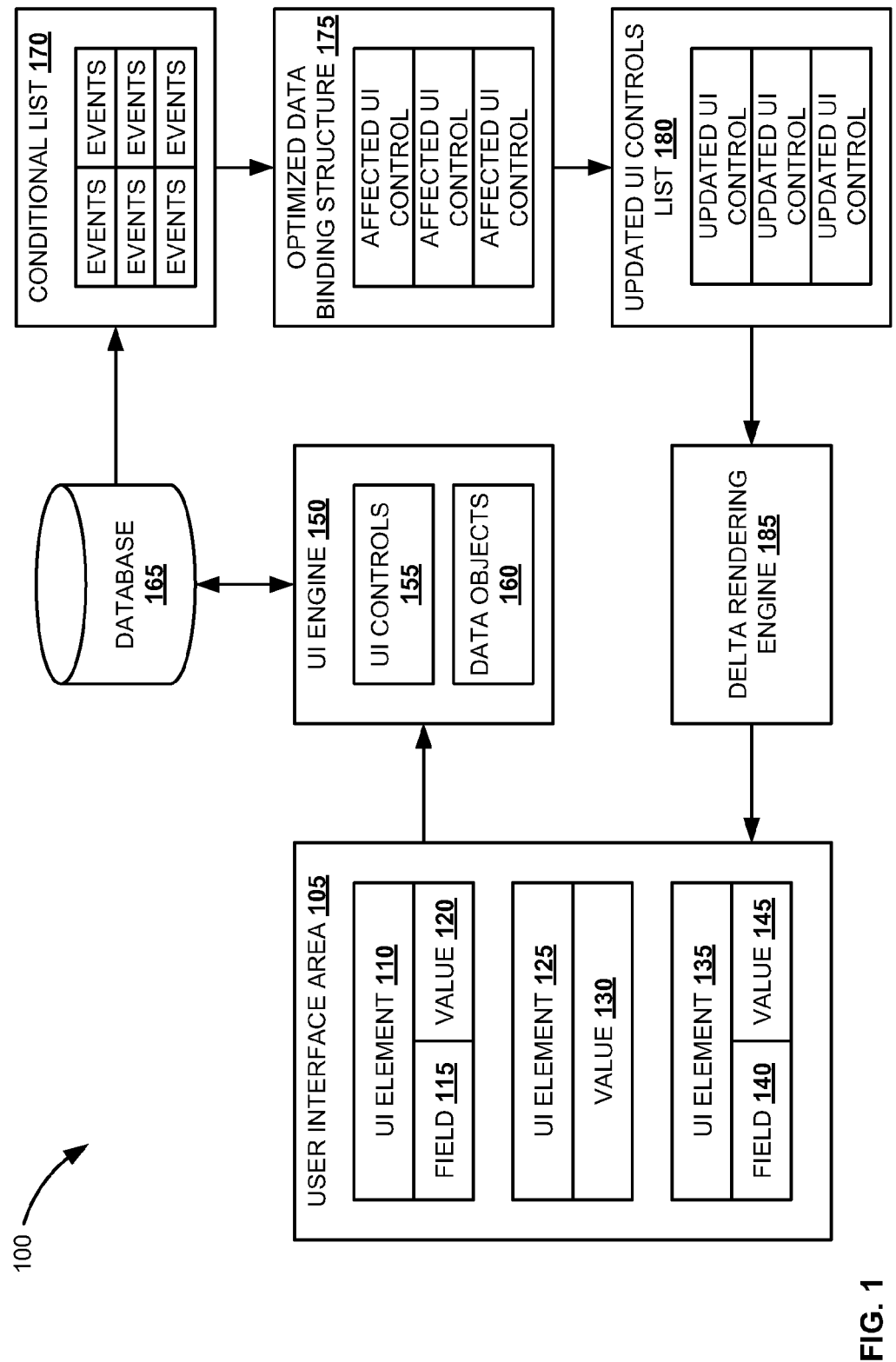
FIG. 1 is a block diagram illustrating an overview of a method to regenerate a user interface area according to an embodiment.

FIG. 1 is a block diagram illustrating an overview of a method to regenerate a user interface area according to an embodiment. The UI area having multiple data sources is regenerated based upon changes made to UI elements associated with the UI area. The UI elements associated with the UI area include UI controls and data objects. UI controls are UI elements that represent arrangements of editable information (for e.g., read and write enabled) and non-editable information (for e.g., read only enabled) and hold the data processed by an associated application and the available interactions on this data. In an embodiment, the editable information is changeable by users and programs, and the non-editable information is changeable by program only.

Data objects are editable entities representing transitory compilations of attributes of a corresponding UI element. A path that is used to access this data object is called a binding. UI technologies use UI controls as an interface for application development, and a renderer generates a corresponding markup fragment from the UI controls and its properties. Since the UI area has multiple data sources, a mode of data access is specified for accessing the data rather than the actual value. While rendering the UI area, the renderer decodes the specified access and determines the actual value. Thus the final UI is a result of the information from both the UI control and the corresponding bound data. When the bound data or the UI control is modified, the UI area is correspondingly updated and regenerated.

To efficiently regenerate the modified UI elements, thereby reducing the CPU usage and the amount of data exchanged, an optimized regenerating process may be employed.

Examples for optimizing the regeneration process include minimizing a quantity of regenerated UI elements by determining affected UI elements, removing duplicates and existing elements, maintaining threshold to determine a quantity of regeneration, regenerating one or more parts of a UI element, and the like. To regenerate the UI area with modified UI elements, the UI controls and data objects associated with the UI area are determined to generate a conditional list. Generating the conditional list includes determining events based upon a correlation between the data objects, the UI controls and the UI area. The conditional list represents an association of the UI controls and the data objects by verifying whether the UI controls and the data objects reflect any modification performed on the data objects. Based upon a modification to a data object, an optimized data binding structure is generated to determine a corresponding UI control that is affected by the modification. An updated UI controls list is computed to include the affected one or more UI controls based upon the optimized data binding structure. Computing an updated UI controls list includes determining the affected one or more UI controls, and compiling the UI controls to generate the list. If the modification is performed on a UI control, the UI control is directly added to the UI controls list. Based upon a trigger to render the UI area, the affected UI controls are regenerated on the UI area by updating the affected UI controls based upon the modification.

Computer system 100 comprises a user interface (UI) area 105 including UI elements 110, 125 and 135. The UI elements may have UI components depending upon the type of UI elements. For instance, if UI element 110 is a text box, it includes field 115 representing a name of the UI element and value 120 representing the editable entity of the UI element. Similarly, UI element 125 includes value 130, and UI element 135 includes field 140 and value 145. UI area 105 is in communication with UI engine 150 that represents a backend structure of UI area 105. UI engine 150 includes UI control 155 representing the UI controls associated with the UI elements (e.g. 110, 125 and 135) and data objects 160 representing the data objects associated with editable entities (e.g. 120, 130 and 145).

Database 165 stores a relationship map of each of the UI elements, corresponding fields and entities, UI controls and data objects. The relationship map may be used to determine interdependencies between UI controls and data objects. Conditional list 170 is generated by determining UI controls and data objects associated with a current instance of the UI area 105. Conditional list 170 includes events which represent an association between the UI controls and the data objects. The association between each UI control and data object verifies whether the corresponding UI control or data object reflects any modifications performed on the data objects. For instance, if the type of UI element 110 is modified, field 115 and value 120 may also be modified. However if the type of UI element 125 is modified, value 130 may not be modified. The association verifies the status of the UI element, by determining if the element reflects any modification performed on the data object. For example, conditional list 170 may include events that are triggered by each change in a UI element (UI control and/or data object). Conditional list 170 is maintained in a manner to avoid duplication of event entries, thereby not overloading the processor of the computer system. For instance, if field 115 is modified twice, the latest modification is stored and is represented by a corresponding event.

The relationship between data objects 160 and the UI area 105 may include a complex mapping. In an embodiment, the relationship between the UI elements and the data objects include a complex mapping. Complex mapping may also include immutable UI controls and restrict modification to an associated data. To accommodate complex mapping, optimized data binding structure 175 is generated based upon a modification to a data object. Optimized data binding structure 175 is interpreted by detecting the affected UI controls from the modified data objects. The interpretation is accomplished by organizing the bindings between UI controls 155 and data objects 160 in a bi-directional central data structure, where the mapping can be realized via the data objects and via the UI controls.

The interpretation may also be accomplished by building a separate optimized data binding structure containing binding paths of the corresponding UI controls and data objects and the identification of UI controls that are affected due to the modification performed on one or more data objects. Thus, optimized data binding structure 175 includes a list of UI controls that are affected by the modification of one or more data objects. Optimized data binding structure 175 is persisted until the bindings are changed, and upon any changes to the bindings, optimized data binding structure 175 is updated. In an embodiment, a relationship between the markup fragment of UI area 105 and UI controls 155 are also associated with optimized data binding structure 175.

In an embodiment, the bindings may not specifically refer to a data object. For instance, for a table with multiple rows, each row may represent an instance of the data object, and the corresponding binding path may represent the specific instance. For example, the binding path may be represented as: "TABLE.<row number>.FIELD", and while rendering such a path, the <row number> is replaced by an actual number of the row. For such cases, optimized data binding structure 175 includes a binding path of a corresponding instance of the UI control.

In another embodiment, optimized data binding structure 175 distinguishes between binding to a specific data instance of the data objects and binding to iterative data objects. For the specific data instance of the data object, the data object can be used to trace the affected UI control. For iterative data objects, the instances of the data object are traced to determine the affected UI control. This method of distinguishing between data bindings associated with data instance and data bindings associated with iterative data objects includes a lesser number of mappings when compared to the method of including a binding path for each instance.

An updated UI controls list 180 is computed to include the affected UI controls based upon optimized data binding structure 175. Updated UI controls list 180 includes a list of UI controls that are to be updated to regenerate on UI area 105. In an embodiment, UI control specific business logic is included to notify one or more dependent UI controls based upon updating the affected UI controls. These dependencies may be represented as data bindings or evaluated by the business logic to determine the associated dependent UI controls and to compute updated UI controls list 180. Based upon a trigger to render the UI area, the affected UI controls present in updated UI controls list 180 are regenerated on UI area 105 by updating contents of the affected UI controls based upon the modification.

In an embodiment, a complexity of the affected UI controls is computed to determine a degree of regenerating of the UI controls on the UI area. The complexity of the affected UI controls includes an amount of modification, a number of cross references or interdependencies of UI controls, a number of UI controls affected, or the like. A degree of regenerating represents a measure of data that needs to be regenerated on UI area 105. For instance, in a UI segment containing twenty UI controls, if seventeen UI controls are affected, the whole UI segment may be regenerated instead of determining conditional list 170, optimized data binding structure 175 and updated UI controls list 180. In another embodiment, a composite regenerating of the affected UI controls is executed based upon a degree of modification. For instance, consider a UI segment made up of seven UI segment parts; if one UI segment part is affected, only the affected UI segment part may be regenerated instead of regenerating the entire UI segment.

In an embodiment, computer system 100 comprises a UI programming model including a user interface phase to receive the modification to data objects 160 associated with UI area 105 and to regenerate the affected UI controls based upon the modification; an event handling phase to determine conditional list 170 of corresponding events and based upon the modification, to generate optimized data binding structure 175; and a rendering phase to trigger a regenerating of the UI area by regenerating the affected UI controls based upon the modification. In an embodiment, the regenerating of the affected updated UI controls from updated UI controls list 180 is executed by consolidating the affected UI controls and regenerating them during the rendering phase instead of regenerating each affected UI control upon modification.

In an embodiment, the UI programming model is configured to include a UI rendering framework to compute the updated UI controls list including the affected UI controls; a server-side framework to regenerate a markup page based upon the updated UI controls list; and a client-side framework to convert the markup page to an application protocol and transfer the application protocol to a corresponding client.

In an embodiment, the UI controls include a feature of regenerating an attribute of the UI element, instead of regenerating the entire UI element. Hence, if the attribute of the UI element is affected, the attribute is regenerated. For instance, if a UI element has three attributes, 'UI field name', 'UI representation' and 'UI value', and if the attribute 'UI representation' is affected, then 'UI representation' is regenerated.

In an embodiment, a UI rendering framework is configured to compute the updated UI controls list which includes the UI controls that are affected by the modification. A server-side framework regenerates a markup page based upon the updated UI controls list and a client-side framework converts the markup page to an application protocol and transfers the application protocol to a corresponding client. In an embodiment, a markup page is a collection of several markup fragments.

In an embodiment, a threshold for the modification of the data objects is determined and based upon the threshold, a degree of regeneration of the UI controls is determined and rendered on the computer generated UI area. Determining a threshold of the modification includes determining an amount of the modification of the data objects. Based upon the amount of the modification, a degree of regeneration of the UI controls is determined. In an embodiment, if the amount of modifications exceeds the threshold, the entire UI may be regenerated instead of determining the modified UI controls. In an embodiment, the UI area is rendered by delta rendering engine 185.

Figure 2:
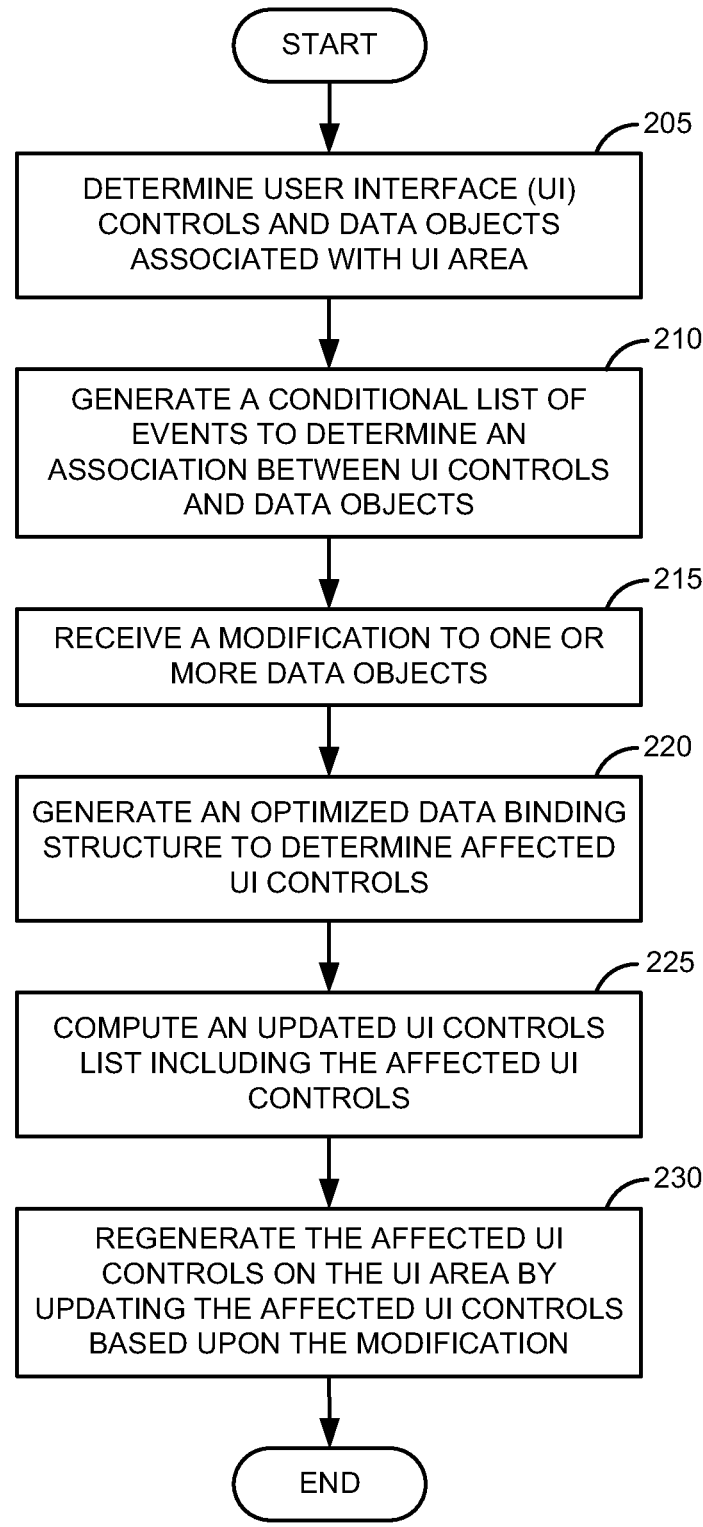
FIG. 2 is a process flow diagram illustrating a computer-implemented method to regenerate a user interface area according to an embodiment.

FIG. 2 is a process flow diagram illustrating a computer-implemented method to regenerate a user interface (UI) area according to an embodiment. At process block 205, UI controls and data objects that are associated with the UI area are determined. At process block 210, a conditional list of events is generated to determine an association between the UI controls and the data objects. The conditional list of events are determined based upon a correlation between the data objects and the UI area, a correlation between the UI control and the UI area, or a correlation between the data object and the UI control. The correlation includes a relation between any two or more entities (e.g. UI area, UI controls, and data objects) such that any change in one entity is accompanied by a corresponding change in the other. The association of the UI controls and the data objects verifies whether a UI control gets affected when its corresponding data control is modified. Hence, the conditional list includes a list of UI controls that may be affected when their corresponding data objects are modified.

At process block 215, a modification to one or more data objects is received. The modification may be received from the UI or an application associated with the UI. At process block 220, based upon the modification, an optimized data binding structure is generated to determine corresponding UI controls that are affected by the modification. The optimized data binding structure includes a list of UI controls that are affected by the modification to their corresponding data objects. At process block 225, based upon the optimized data binding structure, an updated UI controls list is computed, that includes the affected UI controls. In an embodiment, the modification may be received for a UI control. In such cases, the modified UI control is directly included in the updated UI controls list. At process block 230, the affected UI controls from the updated UI controls list are regenerated on the UI area by updating the affected UI controls based upon the modification.

Figure 3:
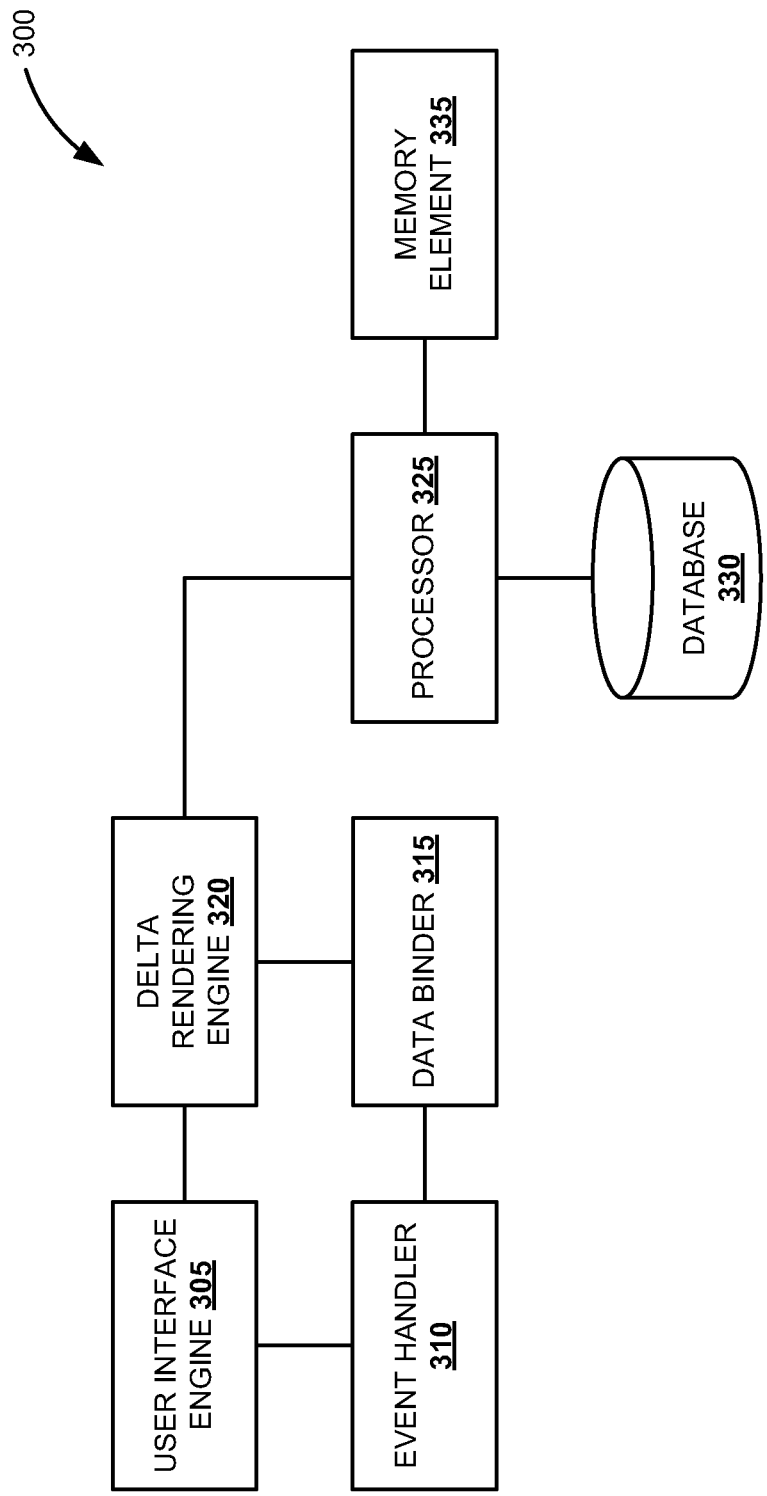
FIG. 3 is a block diagram illustrating a computer system to regenerate a user interface area according to an embodiment.

FIG. 3 is a block diagram illustrating a computer system to regenerate a user interface area according to an embodiment. Computer system 300 includes user interface (UI) engine 305, event handler 310, data binder 315, delta rendering engine 320, processor 325, database 330 and memory element 335. In an embodiment, UI engine 305 is in communication with event handler 310 and delta rendering engine 320. Data binder 315 is in communication with event handler 310 and delta rendering engine 320. Delta rendering engine 320 is in communication with processor 325 of computer system 300. In an embodiment, processor 325 is configured to read and execute instructions stored in memory element 335. The instructions stored in memory element 335 are used to regenerate the UI area according to an embodiment.

A computer generated UI area (interchangeably called a UI area throughout the specification) in communication with UI engine 305 displays one or more UI elements configured to be regenerated on the UI. In an embodiment, to regenerate the UI area, UI engine 305 determines one or more UI controls and one or more data objects that are associated with the UI area. In an embodiment, the data objects and the UI controls associated with the UI area are stored in database 330. Event handler 310 generates a conditional list of one or more events representing an association of the corresponding UI controls and the data objects. These events represent an association of the corresponding UI controls and the data objects associated with the UI area. Processor 325 recognizes one or more modification of one or more data objects. Based upon the modifications, data binder 315 generates an optimized data binding structure to determine corresponding one or more UI controls that are affected by the modification.

Delta rendering engine 320 computes an updated UI controls list including the affected UI controls based upon the optimized data binding structure. Further, delta rendering engine 320 regenerates the affected UI controls on the UI area by updating the affected UI controls based upon the modification. Thus, computer system 300 is utilized to determine the UI controls that are affected by the modification, and the UI area is updated to change the affected UI controls. In an embodiment, the conditional list and the optimized data binding structure are stored in database 330. Based upon a modification associated with the data object, the respective data is accessed from database 330 to compute the updated UI controls list.

In an embodiment, a server is associated with regenerating the UI area. The server hosts event handler 310 and data binder 315. The server is configured to determine the UI controls and the data objects associated with the UI area. Based upon the determined UI controls and the data objects, the server generates a conditional list of the corresponding events representing the UI controls that are correlated to the data objects. Upon receiving a modification in the data object, the server generates the optimized data binding structure. From the structure, the server determines the UI controls that are affected by the modification and assigns them to the updated UI controls list. Based upon a trigger received to render the UI area, the server regenerates the affected UI controls on the UI area by updating the affected UI controls based upon the modification.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 4:
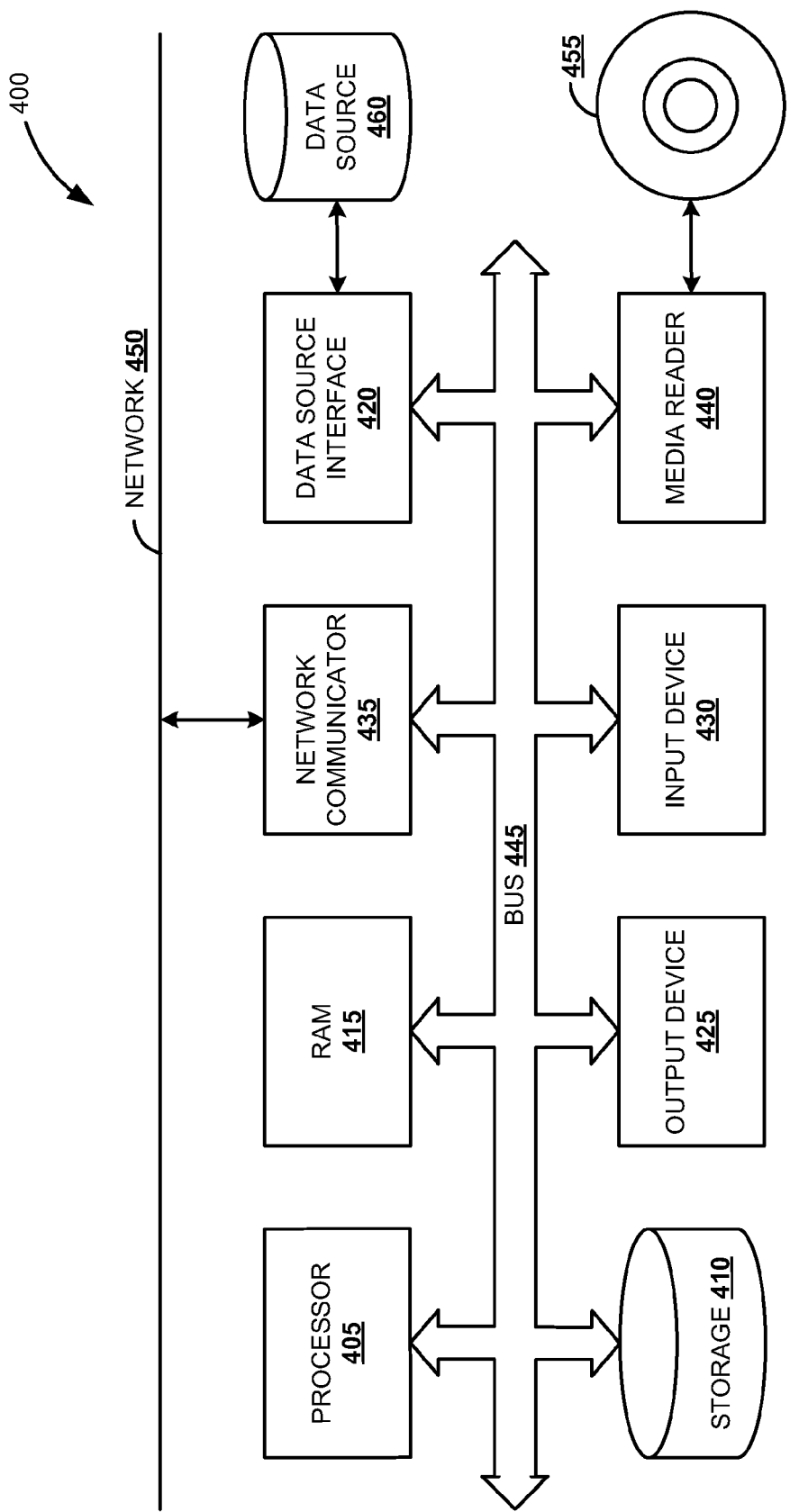
FIG. 4 is a block diagram illustrating an exemplary computer system, according to an embodiment.

FIG. 4 is a block diagram illustrating an exemplary computer system 400, according to an embodiment. The computer system 400 includes a processor 405 that executes software instructions or code stored on a computer readable storage medium 455 to perform the above-illustrated methods. The computer system 400 includes a media reader 440 to read the instructions from the computer readable storage medium 455 and store the instructions in storage 410 or in random access memory (RAM) 415. The storage 410 provides a large space for keeping static data where at least some instructions could be stored for later execution. The stored instructions may be further compiled to generate other representations of the instructions and dynamically stored in the RAM 415. The processor 405 reads instructions from the RAM 415 and performs actions as instructed. According to one embodiment, the computer system 400 further includes an output device 425 (e.g., a display) to provide at least some of the results of the execution as output including, but not limited to, visual information to users and an input device 430 to provide a user or another device with means for entering data and/or otherwise interact with the computer system 400. Each of these output devices 425 and input devices 430 could be joined by one or more additional peripherals to further expand the capabilities of the computer system 400. A network communicator 435 may be provided to connect the computer system 400 to a network 450 and in turn to other devices connected to the network 450 including other clients, continuation servers, data stores, and interfaces, for instance. The modules of the computer system 400 are interconnected via a bus 445. Computer system 400 includes a data source interface 420 to access data source 460. The data source 460 can be accessed via one or more abstraction layers implemented in hardware or software. For example, the data source 460 may be accessed by network 450. In some embodiments the data source 460 may be accessed via an abstraction layer, such as, a semantic layer.

A data source is an information resource. Data sources include sources of data that enable data storage and retrieval. Data sources may include databases, such as, relational, transaction, hierarchical, multi-dimensional (e.g., OLAP), object oriented databases, and the like. Further data sources include tabular data (e.g., spreadsheets, delimited text files), data tagged with a markup language (e.g., XML data), transaction data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to regenerate a computer generated user interface (UI) area, comprising:
    determining one or more UI controls and one or more data objects associated with the computer generated UI area;
    generating a conditional list of one or more corresponding events to determine a correlation between the one or more UI controls and the one or more data objects;
    receiving a modification to the one or more data objects from the computer generated UI area;
    upon receiving the modification to the one or more data objects, a processor of a computer generating an optimized data binding structure based upon the one or more events, to determine corresponding one or more UI controls affected by the modification;
    computing an updated UI controls list by assigning the one or more affected UI controls, based upon the optimized data binding structure; and
    in response to a trigger received to render the computer generated UI area, regenerating the one or more affected UI controls on the computer generated UI area by updating the one or more affected UI controls based upon the modification.

2. The computer implemented method of claim 1, wherein generating the conditional list includes determining the one or more corresponding events based upon a correlation between
    the data objects and the computer generated UI area,
    the one or more UI controls and the computer generated UI area, and
    the data objects and the one or more UI controls.

3. The computer implemented method of claim 1, wherein generating the conditional list includes determining an association of the one or more UI controls and the data objects to verify whether the corresponding one or more UI controls reflect the modification of the one or more data objects.

4. The computer implemented method of claim 1 further comprising: computing the updated UI controls list based upon a modification of the one or more UI controls, to regenerate the one or more affected UI controls on the computer generated UI area.

5. The computer implemented method of claim 1, wherein generating the optimized data binding structure further comprises: distinguishing between one or more data bindings associated with corresponding one or more data instances of the data objects and one or more data bindings associated with corresponding one or more iterative data objects.

6. The computer implemented method of claim 1 further comprising: determining the one or more UI controls from the optimized data binding structure when the computer generated UI area is associated with one or more immutable UI controls.

7. The computer implemented method of claim 1 further comprising: generating a UI control specific business logic to notify one or more dependent UI controls based upon updating the one or more affected UI controls.

8. The computer implemented method of claim 1 further comprising: computing a complexity of the affected UI to determine a degree of regenerating of the one or more affected UI controls on the computer generated UI area.

9. The computer implemented method of claim 1, wherein regenerating the one or more affected UI controls further comprises: consolidating the one or more affected UI controls.

10. The computer implemented method of claim 1 further comprising:
    determining a threshold for the modification of the one or more data objects; and
    based upon the threshold, determining a degree of regenerating of the one or more UI controls to be rendered on the computer generated UI area.

11. The computer implemented method of claim 1 further comprising: executing a composite regenerating of the one or more affected UI controls based upon a degree of modification.

12. The computer implemented method of claim 1 further comprising:
    eliminating one or more duplicate affected UI controls from the updated UI controls list to optimize the regenerating.

13. The computer implemented method of claim 1 further comprising:
    a UI rendering framework to compute the updated UI controls list including the one or more affected UI controls;
    a server-side framework to regenerate a markup page based upon the updated UI controls list; and
    a client-side framework to convert the markup page to an application protocol and transfer the application protocol to a corresponding client.

14. A computer system to regenerate a computer generated user interface (UI) area, comprising:
    a processor configured to read and execute instructions stored in one or more memory elements; and
    the one or more memory elements storing instructions to
        a user interface (UI) engine to determine one or more UI controls and one or more data objects associated with the computer generated UI area;
        an event handler to generate a conditional list of one or more events representing a corresponding association of the one or more UI controls and the data objects, and to determine a threshold for the modification of the one or more data objects and a degree of regenerating of the one or more UI controls;
        a data binder to generate an optimized data binding structure based upon a modification of the one or more data objects, and determine corresponding one or more UI controls affected by the modification; and
        a delta rendering engine
            to compute an updated UI controls list including the one or more affected UI controls based upon the optimized data binding structure, and to regenerate the one or more affected UI controls on the computer generated UI area by updating the one or more affected UI controls based upon the modification.

15. The computer system of claim 14 further comprises: a server to
- determine the one or more UI controls and the data objects associated with the computer generated UI area;
- generate a conditional list of the corresponding events representing the one or more UI controls correlated to the data objects;
- receive a modification in the data object from the computer generated UI area;
- generate the optimized data binding structure based upon the modification;
- determine from the optimized data binding structure, the one or more UI controls affected by the modification;
- assign the one or more UI controls affected by the modifications to the updated UI controls list; and
- based upon a trigger received to render the computer generated UI area, regenerate the one or more affected UI controls on the computer generated UI area by updating the one or more affected UI controls based upon the modification.

16. An article of manufacture including a non-transitory computer readable storage medium to tangibly store instructions, which when executed by a computer, cause the computer to:
- determine one or more user interface (UI) controls and one or more data objects associated with a computer generated UI area
- generate a conditional list of one or more corresponding events to determine a correlation between the one or more UI controls and the one or more data objects;
- receive a modification to the one or more data objects from the computer generated UI area;
- upon receiving the modification of the one or more data objects, generate an optimized data binding structure based upon the events, to determine corresponding one or more UI controls affected by the modification;
- compute an updated UI controls list by assigning the one or more affected UI controls based upon the optimized data binding structure; and
- in response to a trigger received to render the computer generated UI area, regenerate the one or more affected UI controls on the computer generated UI area by updating the one or more affected UI controls based upon the modification.

* * * * *